United States Patent [19]

Naubereit et al.

[11] Patent Number: 4,500,886

[45] Date of Patent: Feb. 19, 1985

[54] DATA LINK SHIFT REGISTER OPERATION

[75] Inventors: Henry Naubereit, Maple Shade, N.J.; Thomas F. Long, Warminster; Salvatore R. Picard; Joseph Ritz, both of Hatboro, all of Pa.

[73] Assignee: The United States of America as represented by the Secretary of the Navy, Washington, D.C.

[21] Appl. No.: 455,674

[22] Filed: May 11, 1965

[51] Int. Cl.³ .............................................. G01S 3/02
[52] U.S. Cl. .................................................. 343/456
[58] Field of Search ........................... 340/146.2, 203; 235/150.22, 150.23, 400, 411; 343/456

[56] References Cited

U.S. PATENT DOCUMENTS

3,289,203  11/1966  Gaylord ............................. 343/456
3,369,239  2/1968   Perkinson et al. .................. 343/456

Primary Examiner—Theodore M. Blum
Attorney, Agent, or Firm—G. J. Rubens; Henry Hansen; W. C. Everett

[57] ABSTRACT

A data link for an automatic aircraft carrier landing system is described in which an aircraft is guided to the carrier by pitch and bank information from the carrier so as to indicate to the pilot of the aircraft whether he is within a prescribed flight path for landing or whether he should be waved off for another approach. The information transmitted from the carrier is received by a microelectronic data link receiver having an internal clock which is synchronized with the incoming information to determine if that particular aircraft is being addressed and if so, what the nature of this information is so that it may be stored and presented to the pilot at a later time for appropriate action.

10 Claims, 11 Drawing Figures

DATA LINK SHIFT REGISTER OPERATION

The invention described herein may be manufactured and used by or for the Government of the United States of America for governmental purposes without the payment of any royalties thereon or therefor.

The present invention relates to a data link for an automatic carrier landing system and more particularly to a means for synchronizing and clocking the data link.

In the automatic carrier landing system a plane is guided onto the aircraft carrier by pitch and bank information indicating whether it is within a prescribed flight path. In addition, discrete signals telling it that it has progressed to various points in the procedure or waving it off are also transmitted from the carrier. The messages transmitted as chosen in accordance with the joint Air Force/Navy data link message standard. These messages must be received in the aircraft by equipment which is light, low-powered, and of high reliability. A data link receiver is needed which uses only logic moduli operating in microelectronic form.

The general purpose of this invention is to provide a microelectronic data link for aan automatic carrier landing system composed almost completely of microelectronic modules. The present invention provides means in this data link for synchronizing the internal clock with the incoming message and means for starting and controlling the timing of the message as it is received. The invention provides comparison means for determining if an aircraft is being addressed and, if so, what the nature of the information is. In subsequent cycles recognition gates transfer the contents of the received information into storage, where it may be viewed by the pilot. The invention provides a microelectronic clock operating a shift register, the shift register having inserted therein false set bits to key the reception of the information.

Accordingly, it is an object of the present invention to provide synchronization and timing for a microelectronic data link in an automatic carrier landing system.

Another object of the invention is to provide means to lock and clear a shift register periodically to receive data used in landing.

A further object of the invention is to generate read signals periodically to cause the contents of the shift register to be detected and utilized.

It is an object of this invention to provide means to determine from the first information received the adress and type of information in an automatic carrier landing system.

It is a further object of the invention to provide means to read the landing direction information and transfer it to storage for use by the pilot.

It is an object of the present invention to provide an automatic carrier landing system using a shift register having inserted therein false set bits to key the reception of information.

It is a further object of the invention to provide a shift register which receives data through an introduction stage keyed by a clock.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1:
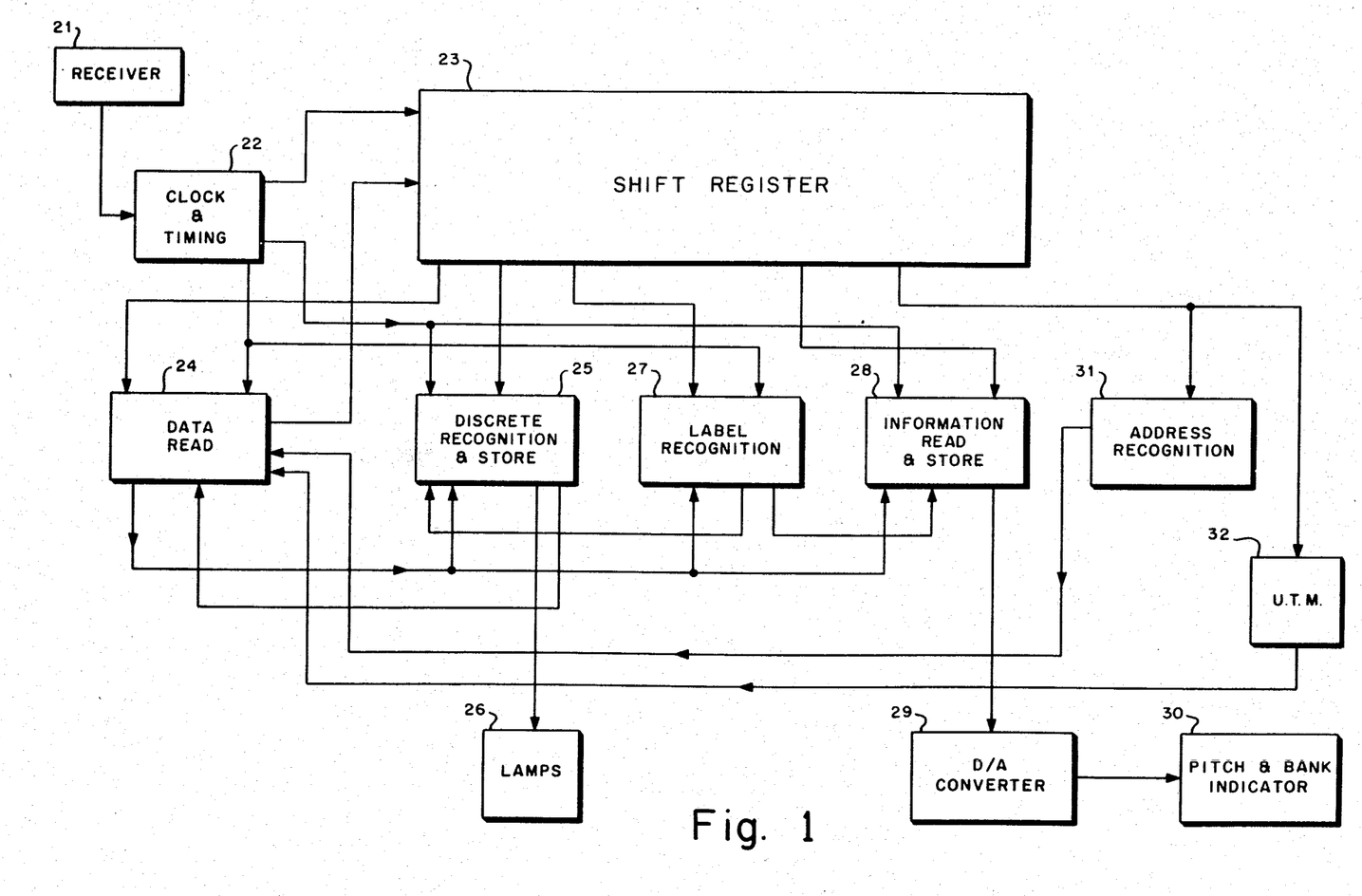
FIG. 1 shows a block schematic diagram of the data link in the automatic carrier landing system according to the present invention.

In FIG. 1 there is shown a receiver 21 providing a data input to a clock and timing section 22 of the data link. Clock and timing section 22 provides shaped data and timing pulses to a shift register 23. Clock and timing section 22 also sends data and timing pulses to a data read section 24 and a discrete recognize and store section 25. Discrete recognize and store section 25 receives information from shift register 23 and read pulses from data read section 24, in which it also sends control pulses. Data and timing pulses also go from timing section 22 to a label recognition section 27 which receives a read pulse from section 24 and information from shift register 23. Label recognition 27 sends a control signal to discrete recognize and store 25 as well as an information read and store 28, which also receives information from shift register 23 and read pulses from data read section 24. The contents of the shift register 23 at one section are sent down to an address recognition section 31 and a universal test message recognition section 32, both of which give output signals to data read section 24. The contents of information read and store 28 are sent to a digital-to-analog converter 29 which controls the position of vertical and horizontal cross pointers in a pitch and bank indicator 30.

Figure 2:
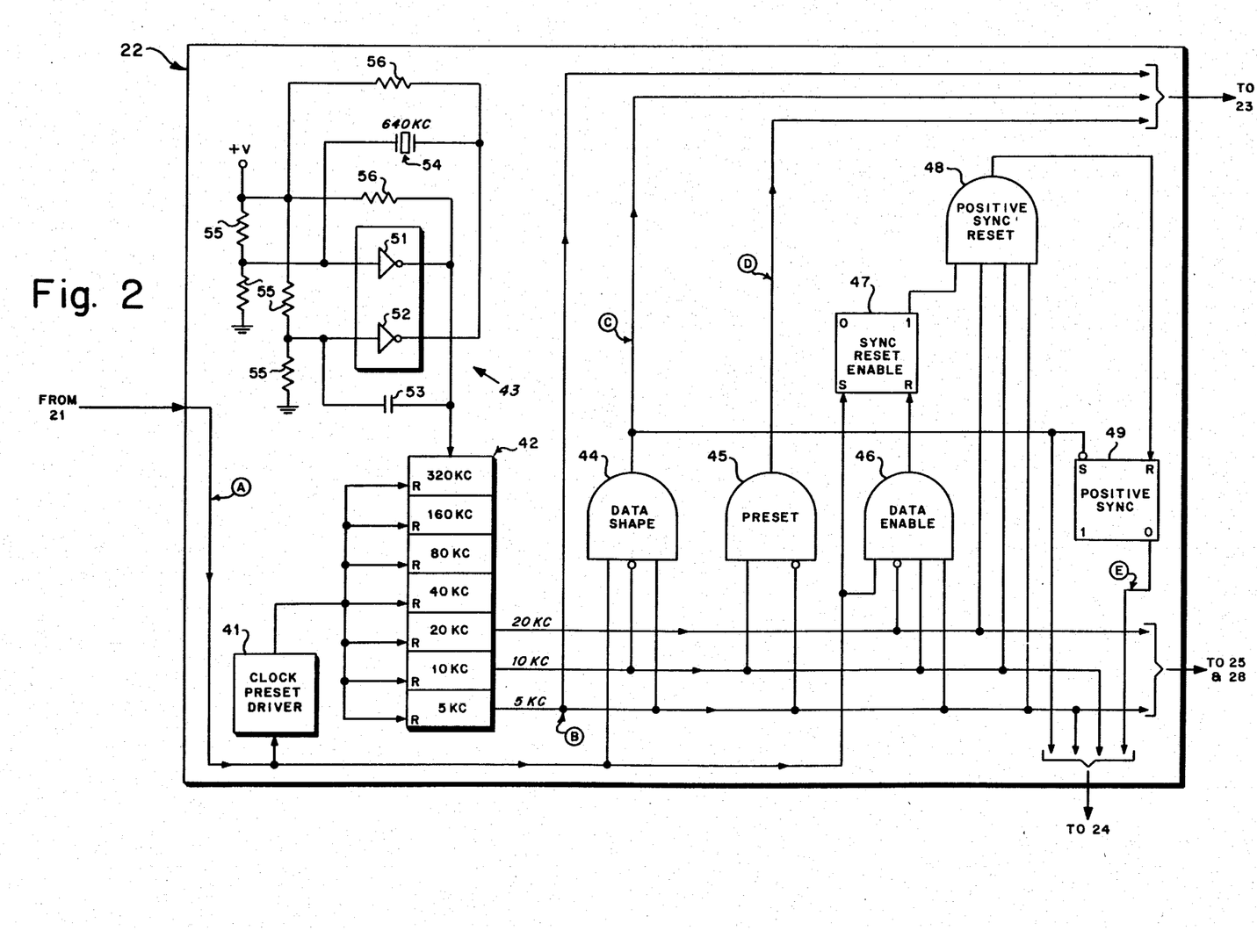
FIG. 2 shows a logic diagram of the clock and timing section shown in FIG. 1.

In FIG. 2 data in the form of digital bits comes in from receiver 21 to a clock preset driver 41. Clock preset driver 41 reset all the stages of a seven stage divide counter 42 which is driven by a clock 43, which will be described in detail subsequently. Clock 43 drives the first stage of divide counter 42 at a rate of 640 kc. The output after the fifth stage therefore is 20 kc., from the sixth stage 10 kc., and from the seventh stage 5 kc. as indicated in FIG. 2. The characteristic of clock preset driver 42 is such that it gives an output pulse to the reset of divide counter 42 each time the input data switches from "0" to "1". By this means the outputs from the divide counter 42 will always be correctly in phase. A data shape gate 44 receives the data from receiver 21 in conjunction with timing signals from the last two stages of divide counter 42 and gives out a pulse at a predetermined portion of each "1" data bit as will be seen at line C in FIG. 10. A preset gate 45 is linked to the last two stages of divide counter 42 in such a way that with each data pulse either "1" or "0" or with each sync pulse it gives out a pulse, as shown in line D of FIG. 10, which occurs 50 microseconds before the pulses from data shape gate 44. A data enable gate 46 is linked to the incoming data and to the last three stages of divide counter 42 and when all conditions are satisfied give an output pulse to the reset portion of a sync reset enable flip-flop 47. The incoming data is also linked to the set point of flip-flop 47. The output of flip-flop 47 is connected to a positive sync reset gate 48 which also receives timing information from the last three stages of divide counter 42. The output of positive sync reset gate 48 is sent to the reset point of a positive sync flip-flop 49 which is set by a negative going signal from data shape gate 44. The inverted position of positive sync flip-flop 49 is sent with the timing information and data information to the data read section 24. The 5 kc. clock signals, the shaped data from data shape gate 44, and the preset signal from preset gate 45 are sent to shift register 23.

The clock 43 operates by means of a pair of inverter amplifiers 51 and 52. The output of amplifier 51 is linked through a capacitance 53 to the input of amplifier 52 and the output of amplifier 52 is linked through a crystal 54 to the input of amplifier 51. Both amplifiers 51 and 52 are normally biased in the high input stage by bias resistances 55. Both amplifiers have their outputs linked by resistances 56 to the voltage supply. It will be seen that the condition of clock 43 is not stable and the voltage at the output of amplifier 51 will tend to oscillate back and forth between high and low voltage. Crystal 54 is a 640 kc. crystal which provides close control of the timing of the output pulses.

Figure 3:
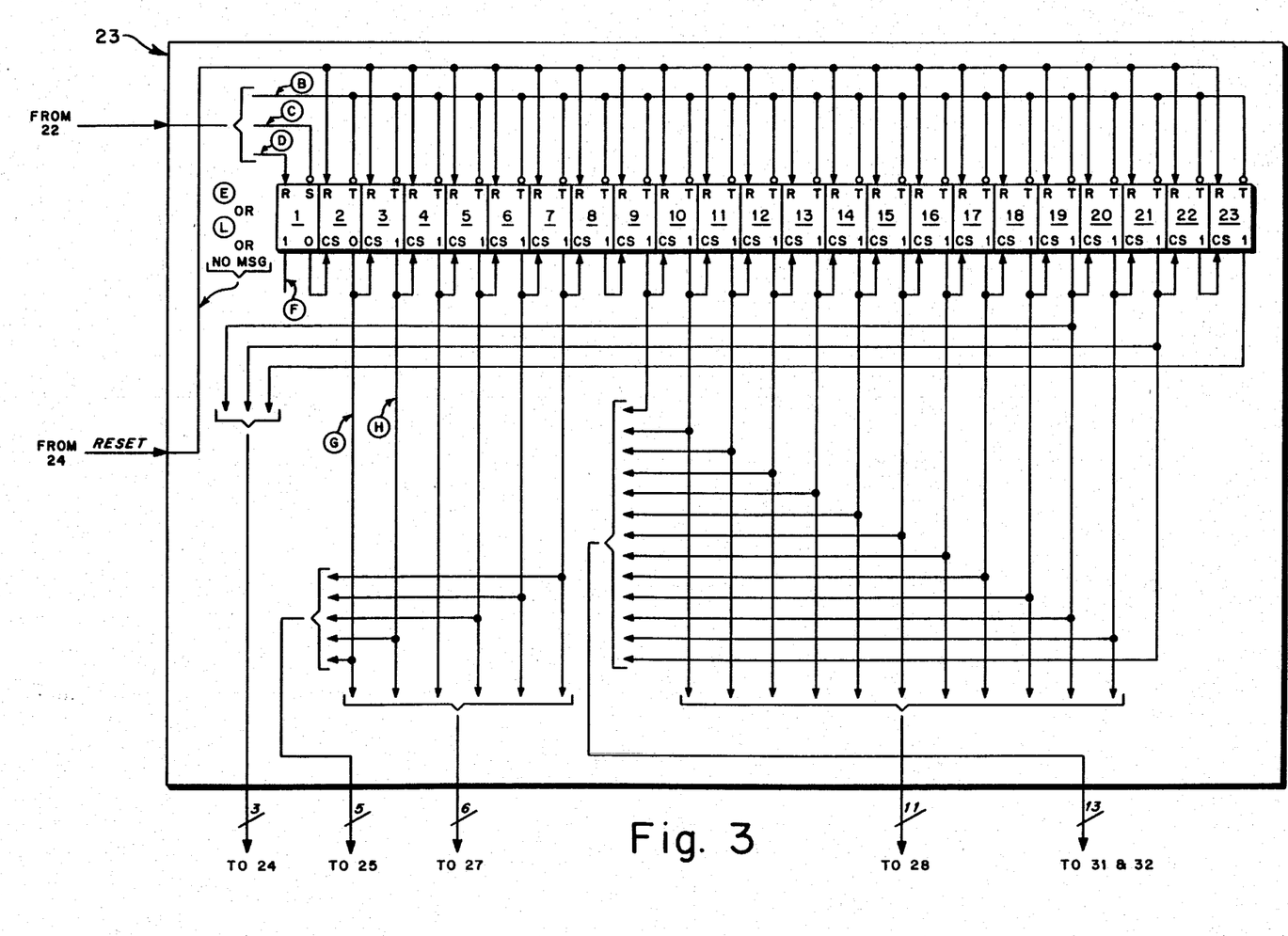
FIG. 3 shows the shift register shown in FIG. 1 with the accompanying wiring.

In FIG. 3 is shown the shift register 23 which is composed of 23 flip-flops each similarly constructed. The output of each stage is connected to the control signal of the next following stage so that when the trigger is applied each stage will take on the condition of the stage preceding it. In the first two stages the "0" condition rather than the "1" condition is connected to the control signal of the following stage. This has the effect of putting a false "1" in at the second stage of the shift register to start with. The purpose of this will become evident subsequently. The second through twenty-third stages are triggered by the 5 kc. clock pulse from counter 42. Stage 2 therefore becomes the first stage of the shift register proper. As indicated by the circles, it is the negative going portion of the 5 kc. clock pulse which activates the transition. The inputs to the first stage are the shaped data and preset signals from gates 44 and 45, respectively, as shown in FIG. 2. These are noted by lines C and D in FIG. 10. The entire flip-flop except for stage 1 is reset by a reset signal from data read section 24. As shown in FIG. 3 the outputs of stages 19, 21 and 23 are sent to the data read section 24 where they are used for control purposes, as will be explained subsequently. The conditions of stages 2 through 7 are sent to label recognition section 27. The conditions of stages 2, 3, 5, 6 and 7 are also sent to the discrete recognition and store 25. The conditions of stages 9 through 21 are sent to the address recognition section 31 and the universal test message section 32. The conditions of stages 10 through 20 are also sent to the information read and store section 28.

Figure 4:
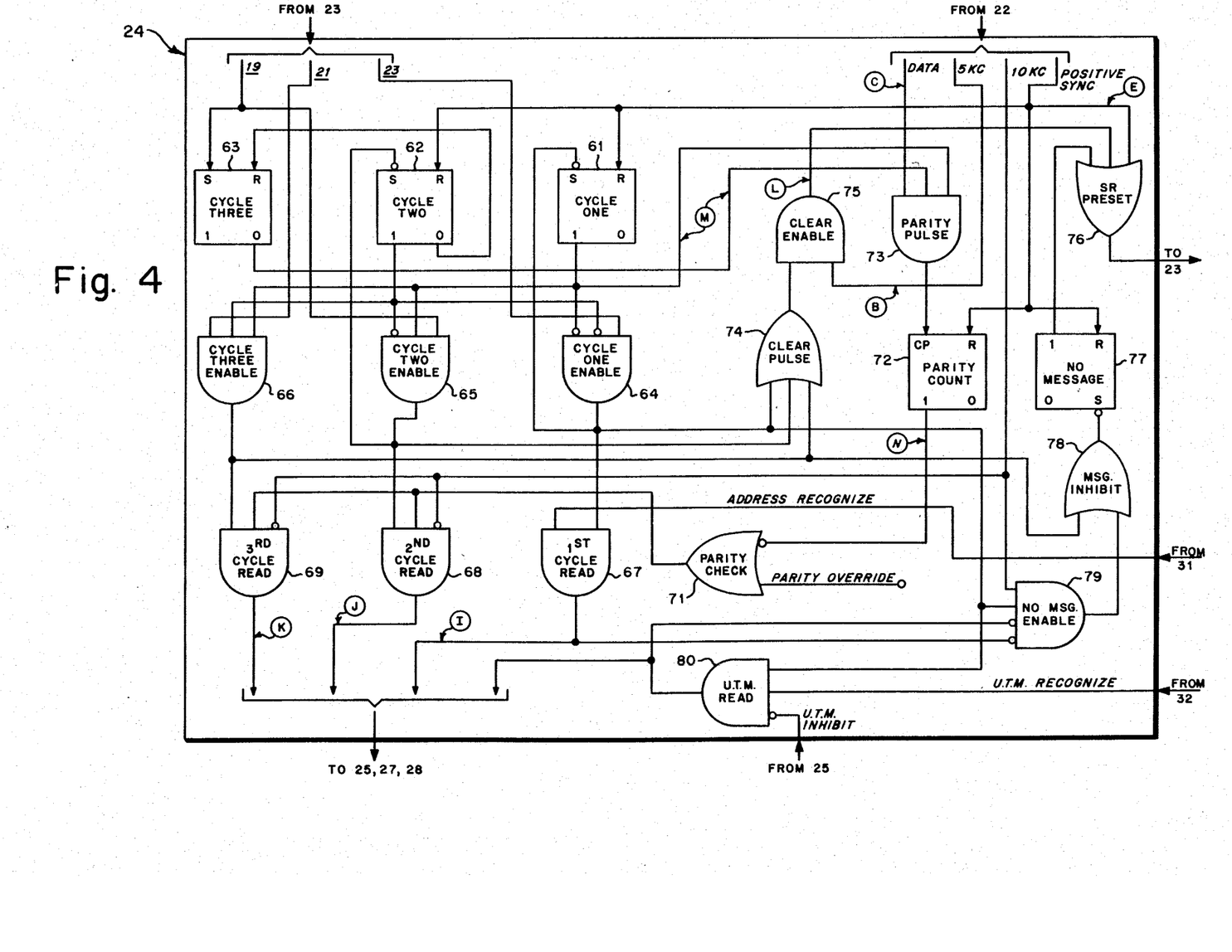
FIG. 4 shows a logic diagram of the data read section shown in FIG. 1.

In the data read section 24 shown in FIG. 4 there are three flip-flops, a cycle one flip-flop 61, a cycle two flip-flop 62, and a cycle three flip-flop 63. Cycle one flip-flop 61 feeds an input into a cycle one enable gate 64. Cycle two flip flop-62 feeds an input into a cycle two enable flip-flop 65, as well as cycle one enable gate 64, and also a cycle three enable gate 66. A first cycle read gate 67 is activated by an output from cycle one enable gate 64 provided there is an input from address recognize section 31. A signal from cycle two enable gate 65 activates the second cycle read gate 68 when a 10 kc. clock signal and a parity signal agree, as will be explained subsequently. A signal from cycle three enable gate 66 will activate gate 69 when parity and the 10 kc. clock signal agree. The parity signal comes from a parity gate 71 which receives a signal from parity count flip-flop 72 which as indicated by the circle into parity gate 71 must be in the "0" state to enable gates 68 or 69. Parity count flip-flop 72 is reset by a signal from positive sync flip-flop 49 in FIG. 2, noted as E on FIG. 10. Flip-flop 72 counts the pulses received from a parity pulse gate 73. Parity pulse gate 73 receives shaped data from data shape gate 44, and if the conditions of cycle one flip-flop 61 and cycle three flip-flop 63 agree will pass the shaped data bits through to parity count flip-flop 72, which will then proceed to count them on an on-off basis. It will be seen, therefore, that the parity requirement in order to enable gates 68 or 69 is even. It may as easily be made odd by appropriate reversal of the connections.

The shift register clear pulses at the end of each cycle are generated by one of the cycle enable gates 64, 65, 66. Any one of these signals will pass through a clear pulse gate 74 to a clear enable gate 75 where it is gated with a 5 kc. signal. As a result of the 5 kc. signal the pulse will not pass through gate 75 until a half bit after it starts from any of gates 64, 65,66. This pulse passes through a shift register preset gate 76 to the shift register 23 were it resets stages 2 through 23 or shift register 23. As stages 19, 21 and 23 are thereupon reset to "0" and since this inhibits gates 64, 65 and 66, the pulse which issues from enable gate 75 is of very short duration, only long enough to reset the stages of the shift register and turn off, as shown at line L in FIG. 10.

If neither a correct address nor a correct universal test message is recognized by the equipment, in a manner to be described subsequently, the data read section will generate a signal which freezes the shift register. This is done by means of a no-message flip-flop 77, which when it is set on "1" passes a signal through shift register preset gate 76 freezing the shift register 23. No-message flip-flop 77 is reset to "0" by the positive sync signal E. It may be set by the negative going signal from a message inhibit gate 78 which may receive such a signal either from cycle three enable gate 66 or a no-message enable gate 79. No-message enable gate 79 receives a pulse at the end of cycle one from cycle one enable gate 64 which is gated with a 10 kc. signal. Also into enable gate 79 are fed an inverted signal from a UTM read gate 80 and the first cycle read gate 67. First cycle read gate 67 must have a positive address recognize signal from address recognition section 31. UTM read gate 80 must have a UTM recognize signal from UTM section 32. If there is no signal out of either UTM read gate 80 or first cycle read gate 67, no-message enable gate 79 will be enabled and a signal will pass through to set flip-flop 77, the result of which is the freezing of the shift register 23 for the remainder of that message transmission. If there is a signal out of first cycle read gate 67 at the appropriate time, a signal is sent to a missed message lamp, not shown, to indicate that a correct address was received. The missed message lamp is a capacitive linked lamp which will stay off provided it receives pulses every so often from first cycle read gate 67. If it fails to receive a pulse within a period of a half second or so the capacitor will charge up enough to turn the lamp on.

Figure 5:
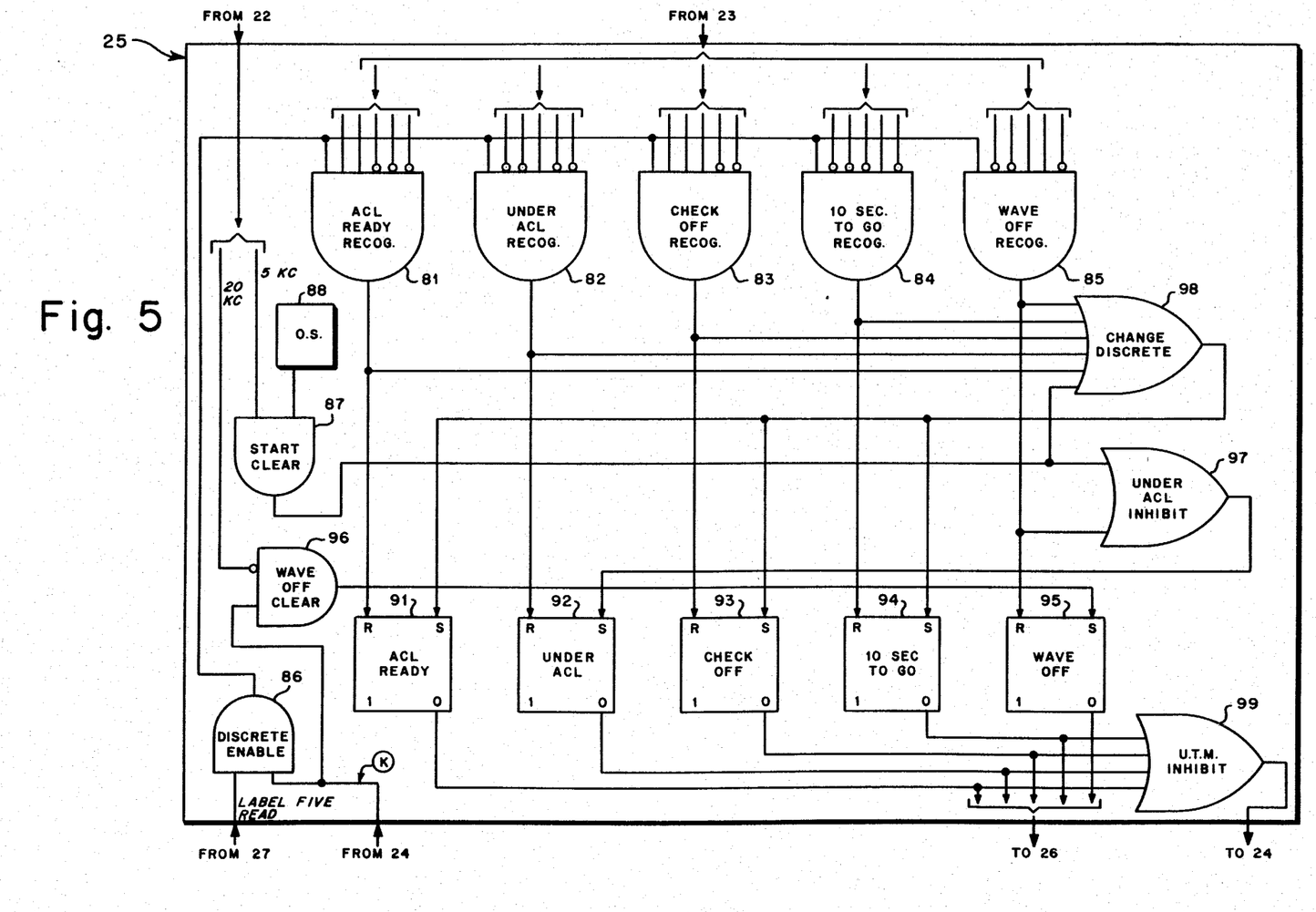
FIG. 5 shows a logic diagram of the discrete recognize and store section shown in FIG. 1.

The discrete recognize and store section 25 is shown in detail in FIG. 5. The contents of stages 2, 3, 5, 6 and 7 of shift register 23 are brought down to five enabling gates, an ACL Ready recognition gate 81, an Under ACL recognition gate 82, a Check Off recognition gate 83, a 10 Seconds To Go recognition gate 84, and a Wave Off recognition gate 85. Each of gates 81 through 85 is enabled by a signal from a discrete enable gate 86. Gate 86 receives as inputs the third cycle read signal K and the label five read signal from label recognition section 27. Each of the respective gates 81 through 85 passes its signal to the reset input point of five flip-flops, an ACL Ready flip-flop 91, an Under ACL flip-flop 92, a Check Off flip-flop 93, a 10 Seconds To Go flip-flop 94, and a Wave Off flip-flop 95. Wave Off flip-flop 95 is set by a signal from a Wave Off clear gate 96 which receives the third cycle read signal K and as inverted 20 kc. signal. The Under ACL flip-flop 92 is set by a signal from an Under ACL inhibit gate 97. The ACL Ready flip-flop 91, the Check Off flip-flop 93, and the 10 Seconds To Go flip-flop 94 are all set by a signal from a change discrete gate 98. Outputs are linked from any of the flip-flops 91 through 95 to a UTM inhibit gate 99 and as outputs to the lamps 26. The characteristic of each of the flip-flops 91 through 95 is that if it receives a reset and a set signal at the same time the reset will override the set signal. The Under ACL inhibit gate 97 receives a signal either from Wave Off recognition gate 85 or from a start clear gate 87 which receives a signal from a one-shot 88 which is initiated when the equipment is turned on. This signal is gated with a 5 kc. clock signal.

Figure 6:
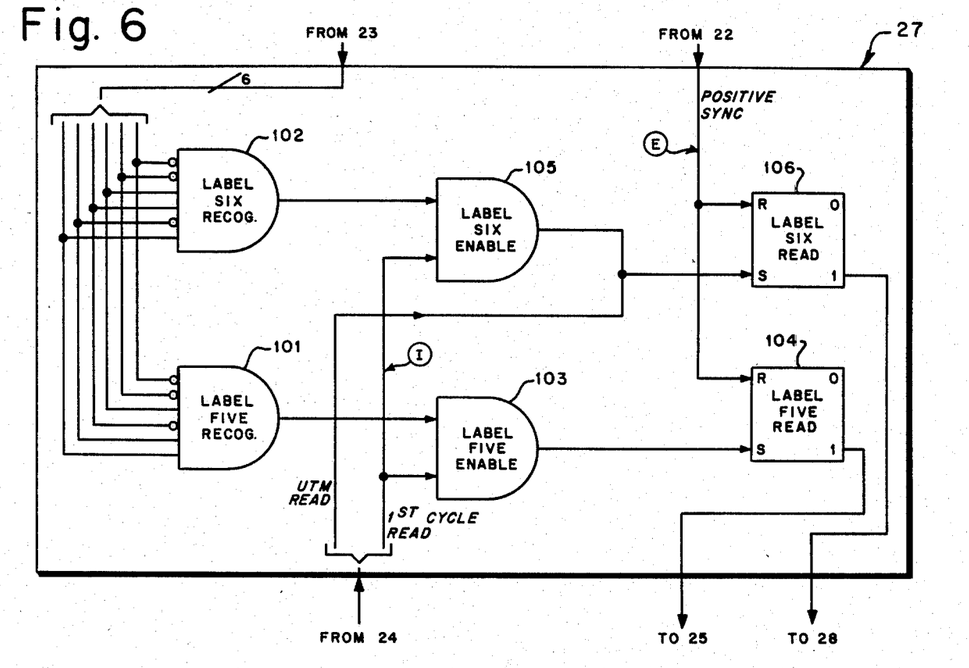
FIG. 6 shows a logic diagram of the label recognize shown in FIG. 1.

In FIG. 6 is shown the label recognition section 27. Section 27 receives as inputs the conditions of stages 2, 3, 4, 5, 6 and 7 of the shift register 23. There are two recognition gates, label five recognition gate 101, and label six recognition gate 102. Label five recognition gate 101 recognizes a six bit word from stages 2 through 7 of the shift register 23 and enables a label five enable gate 103, which, when the first cycle read signal from gate 67 comes in, will set a label five read flip-flop 104 on "1". Label six recognition gate 102 when it is activated enables a label six enable gate 105 which, when the first cycle read signal comes in from gate 67 will set a label six read flip-flop 106 on "1". When the positive sync pulse E comes in it will reset both flip-flops 104 and 106 to "0". Label six read flip-flop 106 will also be set by a signal from the UTM read gate 80 in the data read section 24. When the UTM message is recognized there is no address recognition and therefore no first cycle read pulse, but the UTM read pulse from gate 80 comes directly into the label six read flip-flop 106 to set it on "1". The output of label five read flip-flop 104 goes to the discrete recognize and store section 25 to enable gate 86. The output of label six read flip-flop 106 goes to the information read and store section 28 to permit it to receive the pitch and bank information. When the UTM message is recognized the information read and store section 28 is therefore permitted to receive pitch and bank information even though a label six recognition and an address recognition have not been received.

Figure 7:
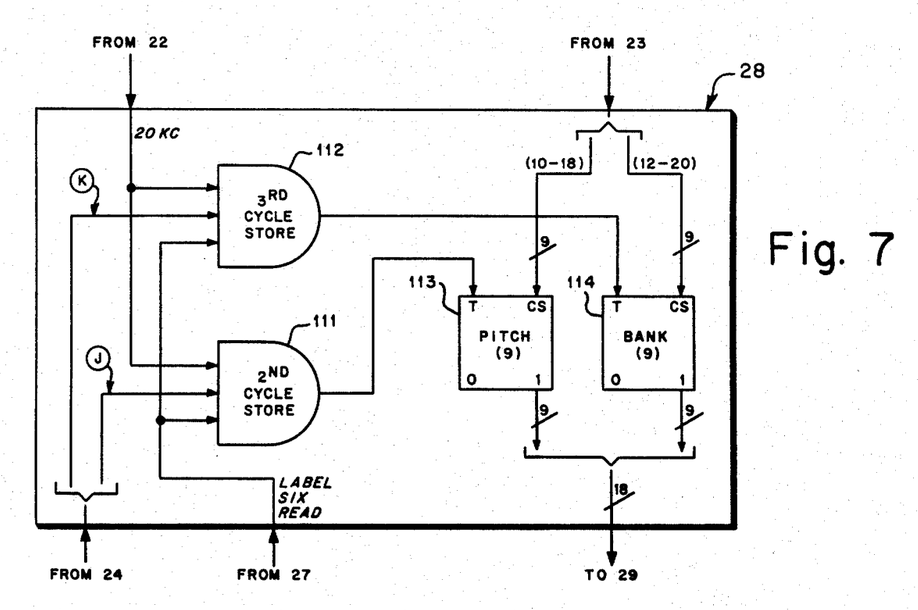
FIG. 7 shows a logic diagram of the information read and store section shown in FIG. 1.

In FIG. 7 is shown the information read and store section 28. There are provided two enable gates, the second cycle store gate 111 and the third cycle store gate 112. Each gate is enabled by a label six read signal from flip-flop 106 and each gate is keyed by a 20 kc. signal form the fifth stage of counter 42. One or the other gate will be enabled by a second or third cycle read pulse J or K, respectively, from gate 68 or 69, respectively. Depending on whether it is the second cycle or the third cycle, signals will come down from the shift register 23 to the control signal points of nine storage flip-flops denoted generally in the case of the second cycle as 113 and denoted generally in the third cycle as 114. The nine flip-flops 113 receive on the control signals thereof the conditions of stages 10 through 18 of the shift register 23. Flips-flops 114 receive during the third cycle on the control signals thereof the conditions of stages 12 through 20 of shift register 23. Flip-flops 113 or 114 will accept the conditions impressed on their control signals upon receiving a trigger signal which will arrive respectively from gates 111 or 112. Storage flip-flops 113 contain nine bits representing the pitch command. Storage flip-flops 114 contain nine bits representing the bank command. The conditions of these eighteen flip-flops are then fed to digital-to-analog converter 29 which converts them into vertical and horizontal signals represented on pitch and bank indicator 30.

Figure 8:
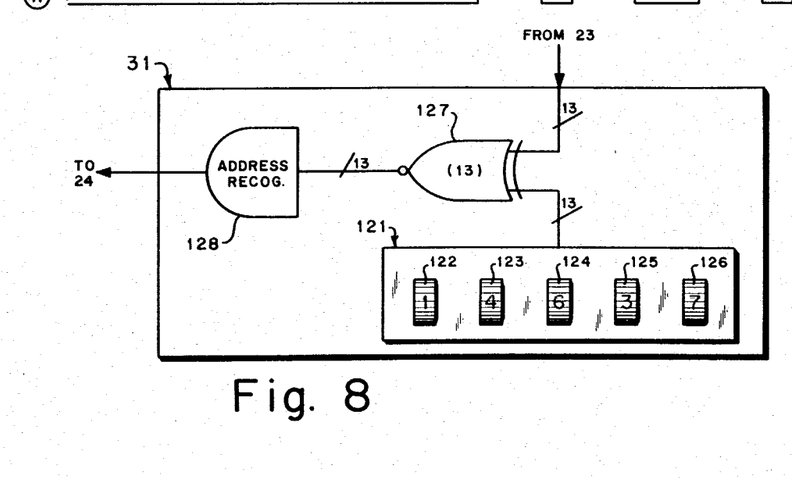
FIG. 8 shows a logic diagram of the address recognition section shown in FIG. 1.

In FIG. 8 is shown the address recognition section 31. The address recognition section 31 has an attachment to the panel 121 of the aircraft where a person can set his own identification number into the equipment. His identification number comprises thirteen digital bits which he sets into the equipment by means of five dials 122 through 126. Dial 122 is a binary dial. Dials 123 through 126 ar octal dials, each of which has three outputs in binary form. The thirteen outputs from the five dials 122 through 126 are compared with the conditions of stages 9 through 21 of the shift register 23 in thirteen identical comparison gates 127. Each of these comparison gates as indicated in FIG. 8 will give a "1" output if both inputs are "1" or both are "0". By means of the thirteen comparison gates 127 there are a set of thirteen outputs all of which must be "1" if the pilot's address is to be recognized. These outputs are fed into an address recognize gate 128 which gives a high output only when all of the conditions of stages 9 through 21 of shift register 23 exactly match the condition of the dials on panel 121. The signal from address recognition gate 128 is fed to first cycle read gate 67 to enable it when the address is recognized.

Figure 9:
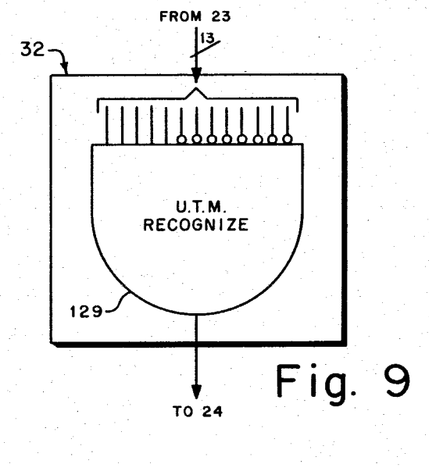
FIG. 9 shows the universal test message recognition section shown in FIG. 1.

FIG. 9 shows the universal test message recognition gate 129 which is set to recognize the universal test message, which as indicated is eight "0's" and five "1's". The inputs to UTM recognize gate 129 are the same conditions of stages 9 through 21 that are fed into the thirteen comparison gates 127. The output of the UTM recognize gate 129 is fed to the UTM read gate 80.

The operation of the automatic carrier landing data link system is as follows. The 70 bit message structure is shown in line A of FIG. 10. Each bit in the message structure is 200 microseconds long giving a clock rate of 5 kc. The first eight bits of the message structure are each low for 100 microseconds and high for the second 100 microseconds. The ninth through twelfth bits are all "0". The thirteenth bit is a "1" used as a start pulse. Bits 14 through 26 constitute a thirteen bit address identifying the aircraft to which the message is directed. In this position may be placed the universal test message which comprises eight "0's" and five "1's". The twenty-seventh bit is a direction digit which is always "0" when the aircraft is receiving. Bits 28 through 32 are a five bit word identifying the labels of the message being sent.

This may identify any one of the thirty-two messages in the joint Air Force/Navy Data Link Message Standard. For the automatic carrier landing system, we are only concerned with labels five and six. Bits 28 through 32 are a five bit binary coding of the number of the label. The thirty-third bit is an odd parity bit checking bits 28 through 32. In this case the six bits are treated as the label word. Bits 13 through 33 constitute the first cycle of information in this invention. According to the invention the message structure has been broken up into three cycles to cut down substantially the size of shift register 23. The second cycle of information comprises bits 34 through 50. This includes a nine bit binary coding, bits 34–42 of the pitch error angle. Bit 34 indicates the direction of error. A "1" indicates positive error, and "0" indicates negative error. A "1" in bit 34 followed by eight "0's" indicates zero error. Maximum positive error is all "1's" while maximum negative error is all "0's". Bits 43 through 49 are on subjects not used in this invention. Bit 50 is a parity check for bits 34 through 49. Bits 51 through 59 are a nine bit word giving bank error expressed in the same terms as the pitch error in bits 34 through 42. Pitch and bank are contained in the label six message. When label six is transmitted bits 60 through 66, 68 and 69 are not used. Bit 67 is an even parity bit checking bits 51 through 66. When label five is transmitted the second cycle is not used and nothing is used in the third cycle except bits 64, 65, 66, 68 and 69, with bit 67 constituting an even parity bit for bits 51 through 66. Bits 64 through 66, 68 and 69 constitute a five bit word identifying discretes. Bit 69 is an even parity bit for bit 68 only, but the five bits together are treated as a single word. The code for ACL Ready is 00011, for Under ACL is 00100, for Check Off is 00111, for 10 Seconds to Go is 01000, and for Wave Off is 01100.

When the 100 microsecond sync pulses come into the clock and timing section 22 from the receiver, they cause the clock preset driver 41 to activate. This sends out a pulse which resets all seven stages of counter 42 to assure correct phasing of the clock signals. Clock preset driver 41 resets the counters coincident with the positive going edge of the receiver output. During the sync period therefore counter 42 actually resets in the middle of each bit rather than at the beginning of each bit. The output of the last stage of counter 42 giving the 5 kc. clock signal is low for 100 microseconds and then high for 100 microseconds. It will be seen that the sync input is exactly out of phase with the 5 kc. clock signal throughout the sync period. For this reason data shape gate 44 and data enable gate 46 cannot be activated during the sync period. The receiver output comes into sync reset enable flip-flop 47 setting it on "1". During the appropriate portion of the timing interval as determined by the combination of the 20 kc., 10 kc., and 5 kc. signals, therefore, positive sync reset gate 48 will be activated causing positive sync flip-flop 49 to be reset on "0". Since data shape gate 44 cannot be activated during the sync period, positive sync flip-flop 49 is not set during the sync period. The high output on the "0" of flip-flop 49 as shown at line E is passed to the shift register 23 to freeze it during the sync operation. It also goes to parity count flip-flop 72, no-message flip-flop 77, and cycle one flip-flop 61 and cycle two flip-flop 62. When cycle two flip-flop 62 is reset it causes cycle three flip-flop 63 also to reset. During the sync period when positive sync is high all of these flip-flops are held in the reset condition regardless of the state of the set input.

Preset gate 45 is set to give out a pulse from a time 50 microseconds to 100 microseconds after the leading edge of the input pulse. During the sync period this preset signal goes to the reset point of introduction stage 1 of shift register 23 to reset it. At the start of bit 13 the counter is again reset. 50 microseconds later the preset signal from gate 45 is again passed to stage 1, making sure it is reset, and 100 microseconds after the leading edge of the start bit, data shape gate 44 issues a 50 microsecond pulse, the trailing edge of which sets flip-flop 49 and stage 1 of shift register 23. Gate 44 during the message portion of each message issues a 50 microsecond pulse for each "1" data bit from the receiver. This pulse is spaced 100 microseconds after the start of the "1" bit and 50 microseconds after the preset pulse from gate 45. Since preset gate 45 is dependent only on the 10 kc. and 5 kc. clock signals it will issue a preset pulse on every bit whether "1" or "0". It will be seen that when a data bit, or "1", comes out of gate 44, stage 1 will be set, and if there is a "0" in the bit output of the receiver, stage 1 will be reset by the pulse from preset gate 45 but not set. By this means the receiver outputs are inserted into the shift register 23. The 5 kc. clock signal is led to the trigger points of all the stages of the shift register 23. As indicated, the trailing edge of the 5 kc. clock signal which comes at the end of each bit period is the activating point, so that stages 2 through 23 will be caused to shift in a manner well known in the art 50 microseconds after stage 1 has been set, or not as the case may be. It will be noted that stage 2 of shift register 23 has its control signal point connected to the "0" output of stage 1 and that stage 3 has its control signal connected to the "0" output of stage 2. This is inverted from the usual procedure and has the effect of inserting in stage 2 a false "1", or set bit when stage 2 is reset at the start, and this "1" will be carried through the shift register 23 to the end. There will be then proceeding through the shift register 23 the succession of message bits headed by the start bit which was bit 13 and preceded by an artificially inserted "1". The condition of stage 1 of the shift register 23 can be seen at line F of FIG. 10. When there is a "1" data bit in the receiver output stage 1 is set at 150 microseconds after the start of the bit and reset 100 microseconds thereafter. It will be seen by considering the condition of stages 2 and 3, shown as G and H in FIG. 10, that the message bits proceed through the shift register 23 to stage 23 in a serial manner.

When the artificially inserted "1" has progressed through shift register 23 to stage 23 a number of things happen. Gate 64 will be enabled and will give out a "1" signal. This will enable gate 67 which will issue a first cycle read signal if there is address recognition. At the point when the artificial bit is at stage 23 the bits representing the address are in stages 9 through 21. If they match the condition set into the panel 121 there will be an output from gate 128 and gate 67 will give a high output. If instead of an address the UTM message has been sent, which is done by the carrier every half second or so, there will be a positive signal into the UTM recognize point of gate 80, enabling it to issue a UTM read signal. If neither gate 67 nor gate 80 is enabled at the point when shift register stage 23 has a "1" in it no-message enable gate 79 will have a high output, which will pass through to no-message flip-fop 77 to set it, and this will freeze shift register 23 until the positive sync portion of the next message resets flip-flop 77. One hundred microseconds after gate 64 is enabled the 5 kc.

clock signal enables clear enable gate 75 which resets shift register 23. Resetting shift register 23 turns off gate 64, which turns off gate 75 so that the duration of the clearing pulse as shown in line L is extremely short, just long enough to insure that shift register 23 has been reset for the second cycle of information. When gate 64 has been turned off the trailing edge will set flip-flop 61 on "1" which will disable gate 64 for the remainder of the cycle. This will have the effect of putting an enabling signal on gates 65 and 66. It also has the effect of enabling gate 73 so that the data pulses as they come in on line C will pass through to the clock pulse point of parity count flip-flop 72. The "1" data pulses will then be counted during the second and third cycles. In the 100 microseconds before the clear pulse of the first cycle resets shift register 23 the label which is transmitted will be recognized in section 27. If a label five is recognized there will be a high output from gate 101. If label six is recognized there will be a high output from gate 102. In either case the appropriate gate will have the first cycle read pulse pass through it when gate 67 goes high as shown on line I of FIG. 10. Gate 67 will not go high unless the address of the pilot has been recognized. If the UTM message has been recognized a pulse will come through from gae 80 directly to the output of gate 105 to set label six read flip-flop 106. Flip-flops 104 and 106 will be reset by the positive sync signal and one or the other will be set according to whether a label five message or a label six message was recognized. Setting label six read flip-flop 106 upon receiving the universal test message will enable the cross pointers to receive pitch and bank information broadcasted by the carrier. This is not pitch and bank information for that particular aircraft but it enables the pilot to check out his cross pointers to see that they are functioning properly. He can tell by his lighted "missed message" lamp that he is not being addressed. When the label five read flip-flop 104 is set it enables discrete enable gate 86 which permits gates 81 through 85 to recognize the discretes sent during the third cycle.

During the second cycle the artificial "1" bit is again inserted at stage 2 and this proceeds through the shift register 23 as before ahead of the second cycle of information. During the second cycle the data information passes through gate 73 to the parity count flip-flop 72 which will continually set and reset according as the total number of "1's" is odd or even. When parity count flip-flop 72 is set parity check gate 71 is not enabled and gates 68 and 69 also are not enabled. A manual parity override is provided which may be used to cancel the effect of the parity flip-flop 72.

When the false set bit which was inserted at shift register stage 2 arrives at the nineteenth position during the second cycle it will enable gate 65, which since cycle two flip-flop 62 is on "0" and cycle one flip-flop 61 is now on "1", will cause cycle two enable gate 65 to give a "1" output. It will be noted that during the first cycle gate 65 was disabled by a low signal from flip-flop 61. This high output from gate 65 will enable gate 68 to give out the second cycle read pulse providing parity count flip-flop 72 is on "0" at the moment. The second cycle read pulse will pass through as shown on line J in FIG. 7 to the second cycle store gate 111 provided a label read signal is received from flip-flop 106. These signals are gated with a 20 kc. clock signal which at the appropriate time will trigger the none storage flip-flops 113 to record pitch information. These nine bits of pitch information are in the stages 10 through 18 of the shift register 23 as they were inserted immediately following the artificial "1" bit. If a label five was received gate 111 is not enabled and no pitch information is received. One hundred microseconds after the "1" signal is received from stage 19 of the shift register 23 the 5 kc. clock signal will enable gate 75 again to send a clear pulse as shown in line L to the shift register 23 to reset all the stages of the register 23. This will disable gate 65. The trailing edge of the signal from gate 65 will cause cycle two flip-flop 62 to set thereby permanently disabling gate 65 for the remainder of the message. The set signal on flip-flop 72 also goes to gate 66 as an enabling signal. It will be noted that the signal from stage 19 came into the set point of flip-flop 63 but flip-flop 63 at that point had still a high signal on the reset point thereof from flip-flop 62, and as long as there is a high signal on the reset point of flip-flop 63 it will not set.

When shift register 23 is reset by the second clearing pulse the artificial "1" on stage 2 is again inserted and the shift register 23 is prepared to receive the third cycle of information. The third cycle of information, containing either the bank information if the label six is recognized or the discretes, will proceed through the shift register 23. When the artificial "1" pulse reaches the nineteenth stage in the third cycle it will cause flip-flop 63 to set since the signal on the reset of flip-flop 63 is no longer high. The low signal at point "0" of flip-flop 63 will then disable parity pulse gate 73 preventing any further data pulses from passing through to the parity count flip-flop 72. Bit 67, the last bit to be able to pass through gate 73, is a parity bit to check the even parity of bits 51 through 66. Bit 69 is a parity bit which checks on the parity of bit 68 only. Bits 64, 65, 66, 68 and 69 are treated as a five bit word giving the discrete. The data received will continue to pass through the shift register 23 until the artificial "1" reaches stage 21. At this point cycle three enable gate 66 will be caused to issue a "1" output which will enable the third cycle read gate 69 to issue a third cycle read pulse. This third cycle read pulse will be passed through to the information read and store section 28 and the discrete recognize and store section 25. If label six has been received the third cycle store gate 112 will be enabled and upon the occurrence of the 20 kc. clock signal will trigger the nine storage flip-flops 114. These flip-flops will then receive the contents of stages 12 through 20 of the shift register 23. Since the bank bits occupying bits 51 through 59 of the message structure ar immediately following the artificial "1" in stage 21 they will at this time be inserted on flip-flops 114. At this point flip-flops 113 and 114 will contain the pitch and bank information. This information is transmitted to the digital-to-analog converter 29 and from there to the cross pointers of the pitch and bank indicator 30.

If label five has been received the discrete enable gate 86 in discrete recognize and store section 25 will be enabled, and when the third cycle read pulse comes in it will pass through gate 86 to each of the gates 81 through 85 which will then be enabled to recognize the conditions of stages 2, 3, 5, 6 and 7 of the shift register 23. If one of the gates should recognize the condition of the shift register 23 its output signal will reset its corresponding flip-flop 91 through 95. A "1" output from any one of gates 81 through 85 will cause a signal to pass through gate 98 which will put a set signal on flip-flops 91, 93 and 94. If any one of these flip-flops is the one that was activated by its corresponding gate it will stay reset because the reset signal overrides the set signal. If one of these flip-flops was not the one that went high all three gates 91, 93 and 94 will be set. A set signal on these flip-flops shuts them off. Flip-flop 92 is set only by a start signal or a signal from Wave Off recognition gate 85. Wave Off flip-flop 95 is set by a combination of the inverted 20 kc. clock signal and the cycle wave pulse. Unless there is a high output from Wave Off recognition gate 85 Wave Off flip-flop 95 is automatically set at each message. If any one of the flip-flops 91 through 94 is on the reset condition indicating an on signal, a signal will be passed through UTM inhibit gate 99 to inhibit the operation of gate 80. One-shot 88 permits gate 87 to pass through the 5 kc. clock signals for a short period of time to insure the gates 91 through 94 are originally set. One hundred microseconds after the artificial "1" bit has reached stage 21 the 5 kc. clock signal will enable gate 75 for the third time generating the third clear pulse. The shift register 23 will then be reset shutting off the signal from stage 21. This will disable gate 66 which will disable gate 69 and the trailing edge of the signal from gate 66 will also set the flip-flop 77 which will cause the shift register 23 to be frozen until the receiving of the next positive sync signal. The third cycle of information is now complete and the message has been completely received. The three points in time when the first, second, and third read pulses are issued by gates 67, 68 and 69, respectively, may be considered for convenience as three predetermined intervals, because they are the points at which the three sections of the data sequence are in the shift register 23.

It will be understood that the counting of the three cycles, instead of being done by separate flip-flops, may be done by flip-flops linked in a counting configuration. The code sequence may also be split into more than three cycles.

When the pilot is in the air and turns on his equipment the flip-flops 91 through 94 controlling the ACL Ready, Under ACL, Check Off and 10 Seconds to Go lamps will be cleared. The first time that he receives the sync signal his shift register 23 will be cleared and he will prepare to receive an address or universal test message. Until he receives an address there will be no output from the first cycle read gate 67 and, therefore, no pulse to the missed message lamp. Missed message lamp will therefore continue to flash indicating that a correct address has not been received, until the correct address is received. Since the carrier is broadcasting universal test message every half second or so the pilot may in the meantime receive the universal test message. When the universal test message is recognized it will permit reception of pitch and bank information. It will also eventually cause a generation of the third cycle read pulse which will clear Wave Off flip-flop 95 if it has been on. However, the missed message lamp will continue to flash indicating to the pilot that he is not in fact receiving information directed to him. When the carrier is prepared to broadcast to that particular pilot the first sequence that it will broadcast will include the discrete for the Check Off signal. This is a broadcast sequence with a label five word in bits 28 through 33. Flip-flop 93 will be turned on, which will thereafter inhibit reception of the UTM message. This tells the pilot to start into landing procedure. The pilot will thereafter not receive pitch and bank information until it is directed to him specifically. The second discrete broadcast is the ACL Ready signal which indicates to the pilot that the aircraft computer is checking his plane into its system, and clears the Check Off discrete. The third discrete that is broadcast under label five transmission is the Under ACL signal. This will clear the ACL Ready flip-flop 91. This indicates to the pilot that the carrier is now ready to receive him and tells him to start into his approach. Thereafter, the carrier will broadcast to the pilot under a label six transmission, the pitch and bank information that is detected by the carrier radar indicating to the pilot his position on approach. When the carrier radar detects that the pilot has 10 sections to go to touchdown it will broadcast under the label five transmission the 10 Seconds To Go signal. This will reset the 10 Seconds To Go flip-flop 94 lighting the 10 Seconds to Go lamp. During this procedure the Under ACL lamp will stay lit indicating to the pilot that his equipment is still receiving normally.

If the carrier detects for any reason something wrong in the pilot's approach it will broadcast under the label five transmission the Wave Off signal. This will reset flip-flop 95 and clear each of the other four flip-flops leaving only the Wave Off lamp lit. The Wave Off lamp has an oscillator connected to it so that when it is lit it flashes on and off, indicating clearly to the pilot that he must pull up his aircraft and start over. The carrier will continue to broadcast the Wave Off discrete message until it has detected that the pilot has responded by canceling his landing. The aircraft is then enabled to receive the universal test message which is broadcast at intervals. The reception of any message other than a Wave Off discrete will clear the Wave Off flip-flop 95 and turn off the Wave Off lamp. However, the first time the aircraft receives the correct address the UTM will again be inhibited by the setting of the Under ACL flip-flop 92.

Inasmuch as there are 70 bits in the message structure and each bit is 200 microseconds long the entire message structure takes 14 milliseconds.

Figure 10A:
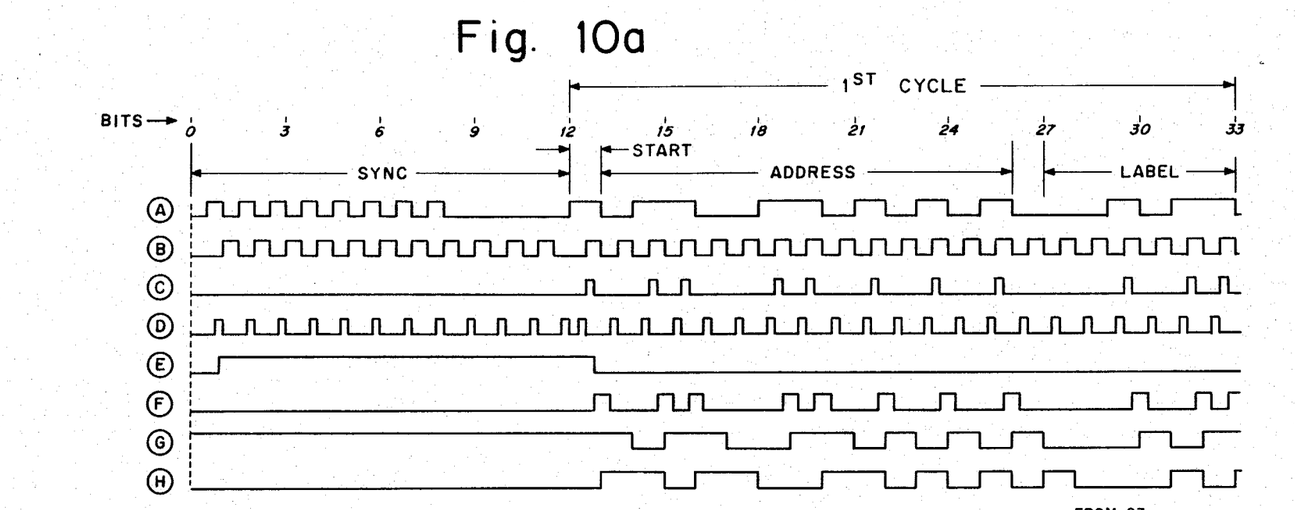
FIGS. 10a and 10b show timing diagrams of the conditions at each of the major points in the diagrams in FIGS. 1 through 9.
Figure 10B:
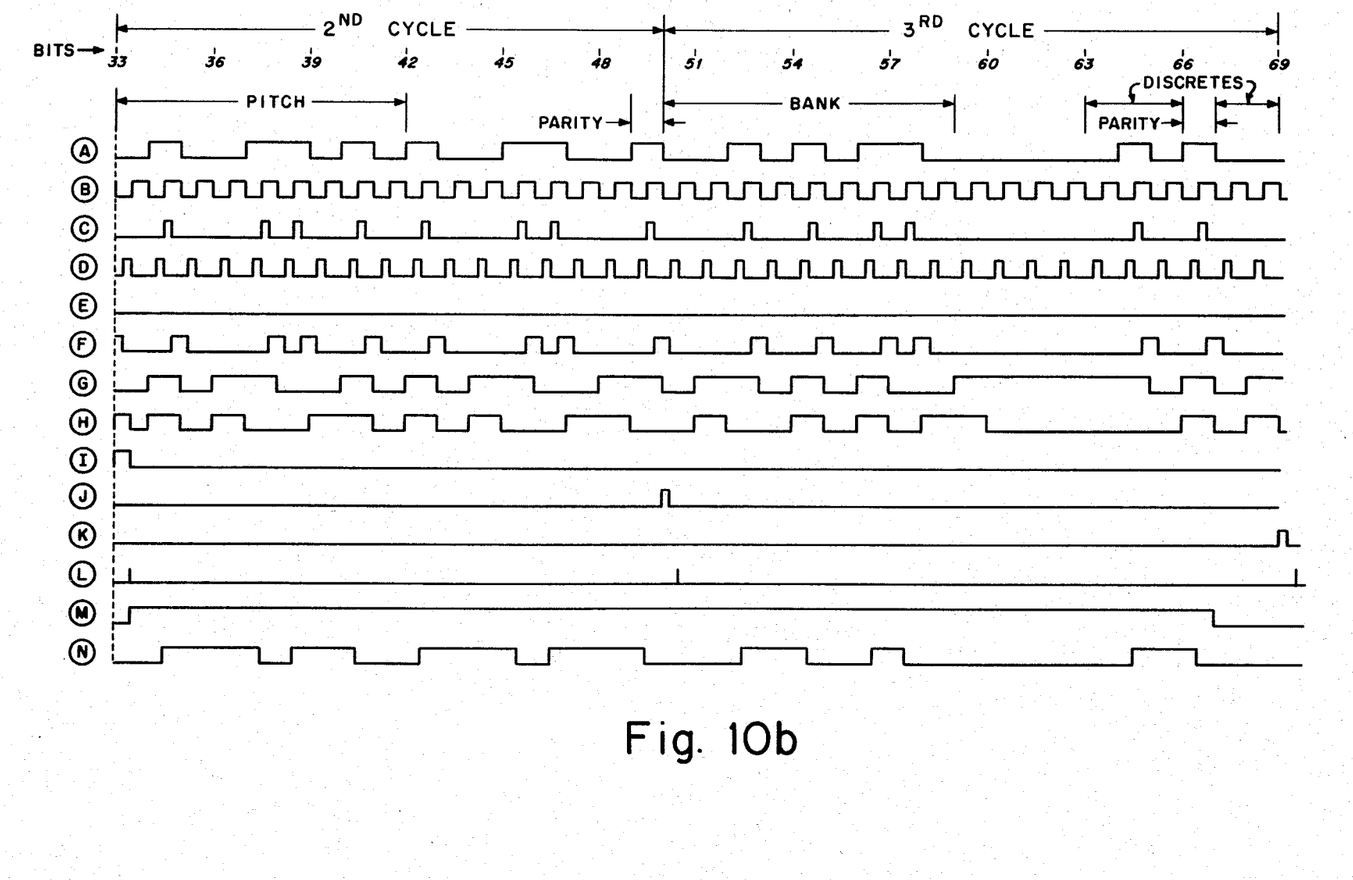

It will be understood that many equivalent forms of logic may be used according to the invention. For example, positive logic has been shown throughout but negative logic using NAND/NOR gates may also be used provided that the critical timing as shown in FIG. 10 is maintained. It will also be understood that any form of bistable storage element, such as relays or magnetic elements, may be substituted for the flip-flops, so long as the essential logic characteristic are maintained.

Substantially all the components of the present invention are made with microelectronic modules. These modules are set miniaturized modules having high reliability and extremely light weight and volume, such as, for example, the Texas Instrument 51 Series of NOR/NAND circuits. The clock oscillator 43 employs two inverter amplifiers 51 and 52 in a single module, for example, on SN514 module of Texas Instrument. The counter 42 uses seven flip-flop modules, for example the SN511 module of Texas Instrument.

Obviously many modifications and variations of the present invention are possible in the light of the above teachings. It is therefore to be understood that within the scope of the appended claims the invention may be practiced otherwise than as specifically described.

What is claimed is:

1. In an automatic aircraft carrier landing system having a carrier provided with a radio transmitter for transmitting a predetermined sequence of digital information and a plurality of aircraft each having a radio receiver for receiving said sequence, a data link in each aircraft for translating said sequence into aircraft guidance information, comprising:

a shift register connected to said receiver to receive said sequence;

a clock connected to advance said register at the rate of said sequence;

means to read from said register at predetermined intervals portions of said sequence; and timing means to control the operation of the shift register and reading means;

said shift register comprising:

a plurality of stages each connected to transfer its condition to the next succeeding stage upon occurrence of a pulse from said clock; and means to reset all of said stages, one of said stages having its output inverted with respect to the next succeeding stage to insert a false set bit into said register when said register is reset.

2. A data link as recited in claim 1 further comprising: an introduction stage flip-flop the output of which is connected to the first stage of said shift register, said introduction stage being set and reset by incoming data.

3. A data link as recited in claim 2 wherein said introduction stage flip-flop has its output inverted with respect to said first shift register stage.

4. A data link as recited in claim 3 wherein the stage of said shift register having its output inverted with respect to the next one is the first stage of said shift register.

5. A data link as recited in claim 4 wherein said introduction stage is reset by a timing signal occurring a predetermined time before said clock pulse, and is set by a data bit combined with timing signals occurring a predetermined time after said reset timing signal and before said clock pulse.

6. A data link as recited in claim 1 wherein each predetermined interval comprising a portion of said sequence is determined by the arrival of said false set bit at a predetermined stage of said register.

7. A data link as recited in claim 6 wherein said predetermined stage is different for different portions of said sequence.

8. A data link as recited in claim 1 wherein said clock comprises: an oscillator; and a series of divide by two counting stages, the first alternating on pulses from said oscillator, the output of the last stage being at the rate of said sequence and all of said figures being reset by an incoming data bit.

9. A data link as recited in claim 8 wherein said oscillator comprises:

a first inverter;

a second inverter; and a capacitance connecting the output of said first inverter to the input of said second inverter and a crystal having a predetermined resonant frequency connected from the output of said second inverter to the input of said first inverter.

10. A data link as recited in claim 8 further comprising:

an AND gate having as inputs the received data, the output of the last stage of said series and the inverted output of the next to last stage of said series, the output of said AND gate being provided to said shift register.

* * * * *